United States Patent Office 2,813,108
Patented Nov. 12, 1957

2,813,108

PROCESS FOR OXIDATION OF 1-DEHYDROHYDROCORTISONE 21-ACYLATES TO 1-DEHYDROCORTISONE 21-ACYLATES

Arthur R. Hanze, Kalamazoo Township, Kalamazoo County, Mich., assignor to The Upjohn Company, Kalamazoo, Mich., a corporation of Michigan No Drawing. Application May 9, 1956,
Serial No. 583,636

3 Claims. (Cl. 260—397.45)

This invention relates to the conversion of 1-dehydrohydrocortisone 21-esters to 1-dehydrocortisone 21-esters by a novel process resulting in high yields of pure product.

The chemical process characterizing this invention is as follows:

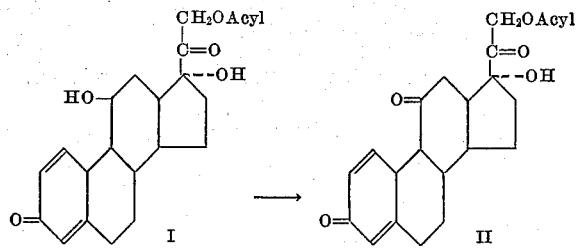

wherein Acyl is the acyl radical of a hydrocarbon carboxylic acid having from one to twelve carbon atoms, inclusive.

In the chemistry of the cortical steroids, it is conventional to oxidize 11-hydroxy compounds to produce 11-keto compounds, and the art is familiar with the general type reaction. It has been found that remarkably high yields of 1-dehydrocortisone 21-ester (Formula II, above) are obtained using reactants and reaction conditions that heretofore have proved unsatisfactory for analogous compounds. It has also been found that conventional reactants and reaction conditions produce relatively low yields of 1-dehydrocortisone 21-ester. Remarkably, the reaction conditions which characterize this invention not only produce unexpectedly high yields of 1-dehydrocortisone 21-acetate, but also make possible the use of less expensive and more readily available reaction media.

High yields afforded by this invention, alone render the process greatly advantageous, considering the expense of the starting 1-dehydrohydrocortisone 21-acetate. As an example of the effect of the process of this invention, yields of purified 1-dehydrocortisone esters within the range of 85 to 95 percent of the theoretical are consistently attained whereas using conventional conditions, i. e., a halogenated oxidant in a pyridine or other tertiary amine containing solvents, usually also containing tertiary-butyl alcohol, the yields of purified 1-dehydrocortisone esters average seventy percent or lower.

Oxidations have been carried out on ring-saturated polynuclear hydroxy compounds using halogenated compounds such as N-haloamides as oxidants and a relatively inexpensive reaction medium such as aqueous acetone in varying yields, the product having keto groups corresponding to hydroxy groups in the starting materials. However, when these conditions of oxidation have been applied heretofore to A-ring unsaturated polynuclear hydroxy compounds, particularly hydrocortisone esters, the yield is low, and the reaction product contains a mixture of unwanted byproducts characterized by halogen in the molecule. As a consequence, it has been necessary to avoid acetone or aqueous acetone as an oxidation medium for transforming hydrocortisone esters to cortisone esters.

This invention is based on the discovery that acetone containing 0.5 to 25 percent water, preferably acetone having a water content of one to eight percent by volume, provides a surprisingly good reaction medium for the oxidation of 1-dehydrohydrocortisone 21-esters to 1-dehydrocortisone 21-esters, and that the yields of product are remarkably high. The results are particularly good when using halogenated compounds as oxidants. The oxidant in the process of this invention is a halogenated oxidant selected from the group consisting of N-chloroamides, N-chloroimides, N-bromoamides, and N-bromoimides.

The invention makes it possible to take advantage of the selective action of the foregoing halogenated oxidants, i. e., oxidizing the 11-hydroxy group to the 11-keto group, while employing relatively inexpensive reaction media, and at the same time achieving yields superior to the yields obtainable using prior expensive media such as pyridine or tertiary-butyl alcohol-pyridine.

The 21-acyloxy group involved in the starting material, and also in the product, can be aliphatic, aromatic, aralkyl, alkaryl, heterocyclic, polybasic, unsaturated, or halogen containing, e. g. lower-alphatic such as formyloxy, acetoxy, propinoyloxy, butyryloxy, valeryloxy, hexanoyloxy, heptanoyloxy, octanoyloxy, preferably acetoxy, trimethylacetoxy, dimethylacetoxy, tertiary-butylacetoxy, cyclopentanepropionyloxy, benzoxy, phenylacetoxy, 2,6-dimethylbenzoxy, succinoyloxy, phthaloyloxy, cyclopentylformyloxy, cyclohexylformyloxy, pyridyl-2-formyloxy, and others. Since the particular ester group present on the starting steroid does not appreciably affect the course of the reaction, the selection of the particular starting ester of 1-dehydrohydrocortisone is not critical. Preferably the acyl radical is that of a hydrocarbon carboxylic acid of from one to twelve carbon atoms, inclusive. The starting compound preferred is 1-dehydrohydrocortisone acetate, since this ester is more readily obtainable and is converted directly and in high yield to 1-dehydrocortisone acetate, a known, useful, physiologically active compound. Nevertheless, other 1-dehydrohydrocortisone 21-acylates such as those mentioned above give consonantly high yields of product having useful physiological properties, i. e., the corresponding 1-dehydrocortisone 21-acylates.

Of the oxidants heretofore mentioned N-chloroacetamide, N-bromoacetamide, N-chlorosuccinimide and N-bromosuccinimide are of special interest because of their availability, N-bromoacetamide being preferred. The reaction is normally conducted at a temperature of zero to fifty degrees centigrade, preferably for convenience at room temperature. An amine such as pyridine, quinoline, lutidine, collidine or picoline can be included is desired to prevent halogenation as a side reaction but the presence of the amine is not critical. A molar excess of the oxidant is preferred to insure completeness of reaction. The course of the reaction can be followed by titration from time to time, using methods known in the art. At the end of the reaction, excess oxidizing agent can be decomposed, or the product removed by filtration according to techniques known in the art.

The following examples are illustrative of the process and products of the present invention, but are not to be construed as limiting.

*Example.—1-dehydrocortisone acetate*

A mixture of ten molecular proportions of 1-dehydrohydrocortisone acetate and 21 molecular proportions of N-bromoacetamide in acetone containing approximately four percent water was stirred at room temperature in the light for a period of three hours. At the end of this reaction time, the reaction rate had subsided to a minimum as determined by titration of active halogen during the course of reaction, 1.26 molecular equivalents of N-bromoacetamide being consumed during the reaction. Thereupon sodium sulfite (25 percent by weight of the 1-dehydrohydrocortisone acetate starting material) was added in the form of a five percent aqueous solution, and the mixture was stirred at zero to five degrees centigrade for thirty minutes. A volume of water equal to one-half of the sodium sulfite solution was then added and the mixture again stirred for thirty minutes. The precipitate was separated by filtration and dried, the yield being 94.7 percent of the theoretical. The product has a melting point of 212 to 216 degrees centigrade (low melting polymorphic form); $[\alpha]_D = +185$ degrees (dioxane). The product gave a negative Beilstein test for halogen and was pure 1-dehydrocortisone acetate by paper chromatographic and infrared analysis.

Instead of the 21-acetate of the foregoing example, other 21-acyloxy 1-dehydrohydrocortisone compounds can be substituted such as the 21-formate, propionate, butyrate, valerate, trimethylacetate, tertiary-butylacetate, cyclopentylpropionate, benzoate, hemisuccinate, and the like, with results essentially identical to those described.

Instead of the N-bromoacetamide used in the foregoing example, N-bromosuccinimide, N-chloroacetamide or N-chlorosuccinimide can be substituted with results essentially identical to those described.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. The method comprising oxidizing 1-dehydrohydrocortisone 21-acylate to 1-dehydrocortisone 21-acylate, said acyl group being that of a hydrocarbon carboxylic acid of from one to twelve carbon atoms, inclusive, which comprises carrying out the oxidation by means of a halogenated oxidant selected from the group consisting of N-chloroamides, N-chloroimides, N-bromoamides, and N-bromoimides, in a medium comprising aqueous acetone, containing from 0.5 to 25 percent water at a temperature of zero to fifty degrees centigrade.

2. The process of claim 1 wherein the halogenated oxidant is used in an amount exceeding molar equivalent of the 1-dehydrohydrocortisone.

3. The method of producing 1-dehydrocortisone 21-acetate which comprises oxidizing 1-dehydrohydrocortisone 21-acetate with a molecular excess of N-bromoacetamide in an acetone medium comprising one to eight percent water by volume, decomposing excess N-bromoacetamide at the end of the reaction and recovering 1-dehydrocortisone 21-acetate from the reaction mixture.

No references cited.